United States Patent
Reithmeier et al.

(10) Patent No.: US 12,060,471 B2
(45) Date of Patent: Aug. 13, 2024

(54) POLYURETHANE-BASED INSULATION BODY AND METHOD FOR PRODUCING SAME

(71) Applicant: Covestro Intellectual Property GmbH & Co. KG, Leverkusen (DE)

(72) Inventors: Marina Reithmeier, Cologne (DE); Christian Hahn, Leverkusen (DE); Reinhard Albers, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 275 days.

(21) Appl. No.: 17/638,893

(22) PCT Filed: Aug. 31, 2020

(86) PCT No.: PCT/EP2020/074178
§ 371 (c)(1),
(2) Date: Feb. 28, 2022

(87) PCT Pub. No.: WO2021/043700
PCT Pub. Date: Mar. 11, 2021

(65) Prior Publication Data
US 2022/0306825 A1      Sep. 29, 2022

(30) Foreign Application Priority Data

Sep. 6, 2019   (EP) ..................................... 19195825

(51) Int. Cl.
| | | |
|---|---|---|
| *B29C 44/00* | (2006.01) | |
| *B29C 44/42* | (2006.01) | |
| *C08G 18/48* | (2006.01) | |
| *C08J 9/12* | (2006.01) | |
| *B29K 75/00* | (2006.01) | |

(52) U.S. Cl.
CPC ............. *C08J 9/122* (2013.01); *B29C 44/005* (2013.01); *B29C 44/42* (2013.01); *C08G 18/4812* (2013.01); *C08G 18/4816* (2013.01); *B29K 2075/00* (2013.01); *C08G 2110/0025* (2021.01); *C08G 2110/0058* (2021.01); *C08G 2330/50* (2013.01); *C08J 2203/06* (2013.01); *C08J 2203/08* (2013.01); *C08J 2375/04* (2013.01)

(58) Field of Classification Search
CPC .. C08J 9/12; C08J 9/122; B29C 44/42; B29C 44/00; C08G 18/48
See application file for complete search history.

(56) References Cited

U.S. PATENT DOCUMENTS

| | | |
|---|---|---|
| 6,809,124 B2 | 10/2004 | Sulzbach et al. |
| 9,023,909 B2 | 5/2015 | Lindner et al. |
| 9,139,683 B2 | 9/2015 | Lindner et al. |
| 9,284,401 B2 | 3/2016 | Lorenz et al. |
| 11,168,172 B2 * | 11/2021 | Hahn ................... F25D 23/066 |
| 2011/0201716 A1 | 8/2011 | Gehinger et al. |
| 2016/0369035 A1 * | 12/2016 | Burdeniuc ............. C08J 9/0023 |

FOREIGN PATENT DOCUMENTS

| | | | |
|---|---|---|---|
| EP | 2910585 | 8/2015 | |
| JP | H08303940 A | 11/1996 | |
| KR | 20000000977 | * 1/2000 | ............ B29C 67/24 |
| WO | 2015109488 A1 | 7/2015 | |
| WO | 2018018571 A1 | 2/2018 | |
| WO | 2018162372 A1 | 9/2018 | |

OTHER PUBLICATIONS

Google Patents translation of KR2000000977. (Year: 2024).*
Anonymous, "Evacuated insulation panel", Research Disclosure, Kenneth Mason Publications, Hampshire, UK, GB, vol. 388, No. 57, Aug. 1, 1996, ISSN: 034-4353, XP007121249.
Ionescu in "Chemistry and Technology of Polyols for Polyurethanes", Rapra Technology Limited, Shawbury 2005; p. 55 et seq. (chapt. 4: Oligo-Polyols for Elastic Polyurethanes); p. 263 et seq. (chapt. 8: Polyester Polyols for Elastic Polyurethanes); p. 321 et seq. (chapt. 13: Polyether Polyols for Rigid Polyurethane Foams); p. 419 et seq. (chapt. 16: Polyester Polyols for Rigid Polyurethane Foams).
Oertel, Gunter, Polyuretane Handbook, 2nd Edition, Hanser Publishing, NY (1993), pp. 98-119 believed to correspond to Kunststoff Handbuch, vol. 7, pp. 104-127, edited by G. Oertel, Carl Hanser Verlag, Munich, 3rd edition (1993).
Ebert, H.-P. et al., High Temp.—High Press., 1993, 25, 391-402.
International Search Report, PCT/EP2020/074178, date of mailing: Nov. 27, 2020, Authorized officer: Florian Paulus.

* cited by examiner

*Primary Examiner* — Christopher M Rodd
*Assistant Examiner* — Shibin Liang
(74) *Attorney, Agent, or Firm* — Donald R. Palladino

(57) ABSTRACT

The present invention relates to an insulation body based a hard, fine-cell and open-cell polyurethane/polyisocyanurate foam with a barrier film, and a method for producing same.

3 Claims, No Drawings

POLYURETHANE-BASED INSULATION BODY AND METHOD FOR PRODUCING SAME

CROSS-REFERENCE TO RELATED APPLICATION

This application is a national stage application under 35 U.S.C. § 371 of PCT/EP2020/074178, filed Aug. 31, 2020, which claims the benefit of European Application No. 19195825.5, filed Sep. 6, 2019, each of which is incorporated herein by reference.

FIELD

The present invention relates to an insulation body based on an evacuated, open- and fine-celled rigid polyurethane/polyisocyanurate (PUR/PIR) foam produced by reaction of a suitable isocyanate-active component with an isocyanate component and subsequent evacuation and a barrier material which attenuates gas permeability and envelops the open-celled rigid PUR/PIR foam.

BACKGROUND

Rigid PUR/PIR foams have long been known. Thermal insulation is a substantial area of application. The use of vacuum insulation panels (VIP) containing rigid PUR/PIR foams for insulation is increasing in importance. Foam quality has a decisive influence on the insulation properties of foams used for vacuum insulation: on the one hand a very small cell size and very homogeneous cell sizes are advantageous and on the other hand a high proportion of open cells is advantageous to allow the foam to be readily evacuated.

In the production of rigid PUR/PIR foams an isocyanate-reactive component which may contain a blowing agent is reacted with an isocyanate. The reaction of isocyanate with any water present can form carbon dioxide as a blowing agent. It is also known to directly add $CO_2$ to the isocyanate-reactive component or to the reaction mixture as a blowing agent.

The sudden decompression of $CO_2$-containing reaction mixtures is described in WO 2001/98389 A1. This patent application relates to a process for producing polyurethane block foam, wherein a carbon dioxide-containing polyurethane reactive mixture is suddenly decompressed from a pressure above the equilibrium solution pressure of the carbon dioxide to standard pressure. The liquid polyurethane reactive mixture is foamed by the liberation of dissolved carbon dioxide and the foamed mixture is applied to a substrate and subsequently cured to afford block foam. The carbon dioxide is initially fully dissolved in the reactive mixture or at least in one of the components polyol and isocyanate at a pressure substantially above the equilibrium solution pressure. Subsequently the pressure is reduced to a pressure close to the equilibrium solution pressure, wherein the pressure is temporarily reduced below the equilibrium solution pressure to liberate small amounts of the carbon dioxide by forming a bubble microdispersion, the components are optionally mixed and the sudden pressure reduction to standard pressure is performed before the liberated carbon dioxide fully redissolves.

WO 2011/054868 A and WO 2011/054873 A disclose production processes for fine- and closed-cell urethane-containing foams using $CO_2$ as a supercritical blowing agent. The production of a microemulsion from the polyol phase and supercritical $CO_2$ is in each case decisive for the success of the process. Said microemulsion is to be established through the use of suitable surfactant components.

WO 2015/109488 A1 describes a production process for urethane-containing foams using $CO_2$ as a supercritical blowing agent. The production process is a multistage process, wherein the polyol component must initially be saturated with $CO_2$ under supercritical conditions before the reaction mixture must subsequently be subjected to pressures of at least 100 bar. The produced foams are said to have small cell sizes and a high porosity. However, foams having a high open-cell content are obtained only when employing propylene oxide-based polyethers and when using specific cell-opening surfactants. The process described in WO 2015/109488 A1 delivers foams having densities >>100 kg/m³. The total duration for the multistage process (saturation, reaction, curing) in the reactor is >>1 h during which time the supercritical conditions must be maintained.

WO 2018/162372 A1 discloses a polyol formulation and a process for producing a fine- and open-celled rigid PUR/PIR foam from a very specific polyol formulation. The process has the feature that foams having low apparent densities and a simple production process are obtained. WO 2018/162372 further discloses that the application of negative pressure to the described rigid PUR/PIR foams results in particularly low thermal conductivity coefficients.

WO 2018/018571 A1 is concerned with using the lowest possible vacuum (1-500 mbar) to achieve low thermal conductivity coefficients (8-14 $mW \cdot m^{-1} \cdot K^{-1}$) in polyurethane (PU) foams. The gas pressure is not to be reduced further since the complexity in terms of apparatus, production conditions and lengthy evacuation times, as well as the costs, are excessively high. The recited example requires 39 min to produce the PU foam which is much too long for use in practice. Since in the example a gas pressure of 2 mbar achieves only a lambda value of 13 $mW \cdot m^{-1} \cdot K^{-1}$ it does not seem possible to obtain a thermal conductivity coefficient of less than 13 $mWm^{-1}K^{-1}$ by establishing a vacuum of 2 to 500 mbar.

JP H08 303940 A discloses an insulation body and a cooling apparatus containing the insulation body. In a multistage process a rigid polyurethane foam is initially produced, dried, finished, enveloped by a barrier film and subsequently evacuated to at least 300 Pa. The resulting vacuum insulation panel is in a next step enveloped by a rigid foam. No information about the pore size is reported.

The research paper "Evacuated insulation panel", Kenneth Mason Publications, Hampshire, UK, vol. 388, no. 57, 1 Aug. 1996, ISSN: 0374-4353 discloses evacuated insulation panels containing open-cell foams. The foams have pore sizes of more than 350 µm.

The processes known from the prior art for producing insulation bodies exhibit an excessively long processing time and/or do not afford a fine-celled foam.

DETAILED DESCRIPTION

The present invention accordingly had for its object to provide a process which makes it possible in a short processing time to produce an insulation body based on a rigid PUR/PIR foam which is open- and fine-celled and for which the abovementioned problems from the prior art occur only to a small extent, if at all.

The object has surprisingly been able to be achieved by the process according to the invention more particularly described hereinbelow.

The invention provides a process for producing an insulation body based on a fine- and open-celled polyurethane/polyisocyanurate foam in a cavity of a mold comprising
 a. optionally inserting an insert into the cavity of the mold, wherein the insert may optionally be pre-molded,
 b. inserting a barrier film into the cavity or, if present, into or onto the insert,
 c. applying a pressure of 8-30 bar in the cavity,
 d. injecting a polyurethane reactive mixture containing supercritical $CO_2$ into the pressurized cavity,
 e. decompressing to ambient pressure after a time of 1 to 40 s measured after the injection,
 f. curing the polyurethane reactive mixture,
 g. applying a vacuum of 0.001 mbar to 0.5 mbar in the cavity,
 h. sealing any holes/openings in the barrier film
 i. and finally demolding the resulting insulation body.

The process according to the invention makes it possible to produce rigid polyurethane foams which have an apparent density of 35-300 kg/m$^3$ and an open-cell content of >90% and in which the cells have an average diameter of <180 μm.

In the process according to the invention for producing a polyurethane-based insulation body it is preferable when a gas scavenger material ("getter" material) is introduced between step b) and c) and/or between step f) and g). This can bind any residual gases and moisture present. Gas scavengers consist of alloys based in particular on barium, zirconium, barium/lithium or zirconium/vanadium/francium. Alloys of alkali metals, alkaline earth metals, titanium, zirconium or vanadium and alloys of one or more of the recited metals are particularly preferred. However, it is also possible to employ metal oxides, such as for example gas scavengers based on about 80-90% by weight of CaO, about 10-12.5% by weight of $Co_3O_4$ and about 3-5% by weight of barium. The gas scavengers may be employed as loose powder or as compressed powder or in/on carriers. For the purposes of the present application the terms "gas scavenger material" and "getter material" are synonymous.

An insert may for example be a half shell of pipe insulations, the housing of a boiler, of a fridge, of a fridge door or of a freezer made of metal or plastic. Furthermore, inserts may for example be a wall made of metal or plastic or a sheet-metal part.

The process according to the invention makes it possible to produce insulation bodies based on rigid, fine- and open-celled PUR/PIR foams using supercritical $CO_2$, wherein the barrier film may be directly inserted into the cavity of the mold.

A very high open-cell content of the foam in the insulation body combined with a small cell size is of interest for certain applications where this foam property makes it possible to reduce the thermal conductivity of the foam by application of negative pressure.

The resulting insulation bodies are also known as vacuum insulation panels. These consist of a core material and a barrier film as a gas-tight sheath. It is important that the employed sheath have a very high gastightness. The vacuum insulation panels according to the invention are therefore generally sheathed with one or more films made of plastic or metal, in particular with a plastic film provided with one or more metal vapor deposited layers or metal oxide vapor deposited or silicon oxide vapor deposited layers, as a barrier film which is introduced into the mold cavity before introduction of the polyurethane reactive mixture. Suitable plastic films include for example laminated or coextruded films comprising layers of polyester, polyamide, polyvinyl alcohol, polyethylene and/or polypropylene. Due to their higher gastightness it is preferable to employ metallized plastic films, in particular aluminum composite films, as the barrier film. The barrier film preferably has a thickness in the range from 10 to 500 μm, preferably in the range from 50 to 200 μm. The thickness of the metal layer is preferably in the range from 0.1 to 15 μm.

The polyurethane reactive mixture employed is particularly preferably a mixture containing the following components:
 A) an isocyanate-reactive component containing
  A1) at least one polyol component having a functionality f of >2.5 selected from the group consisting of polyether polyols, polyester polyols, polycarbonate polyols, polyether polycarbonate polyols and polyether ester polyols, wherein the proportion of all primary OH functions present in the component A1) based on the total number of terminal OH functions in the component A1) is at least 30%,
  A2) at least one catalyst component having Zerewitinoff-active hydrogens,
  A3) at least one cell-opening compound,
  A4) supercritical $CO_2$
  A5) optionally blowing agents with the exception of supercritical $CO_2$ and
  A6) optionally auxiliary and/or additive substances
 and
 B) at least one polyisocyanate component,
  wherein relative to component A) component B) is employed in a ratio of the number of moles of NCO groups from B) to the number of moles of OH groups from A1) multiplied by 100 of 80 to 400.

Terms used in the present application are defined as follows:

The isocyanate index (also known as the index) is to be understood as meaning the quotient of the actually employed amount of substance [mol] of isocyanate groups and the actually employed amount of substance [mol] of isocyanate-reactive groups, multiplied by 100:

$$\text{index}=(\text{moles of isocyanate groups/moles of isocyanate-reactive groups})*100$$

In the context of the present application the "functionality" or "f" of a component mixture is to be understood as meaning the respective number-average functionality of the mixture to which the indication refers. Thus, for example the functionality of the polyol component A1) is to be understood as meaning the number-average functionality of the mixture of the polyols present in the component A1 based on all isocyanate-reactive functions present.

In the context of the present application "molar weight" or "molar mass" or "$M_n$" is in each case to be understood as meaning the number-weighted average molar mass.

In the case of a single added polyol the OH number (also known as hydroxyl number) specifies the OH number of said polyol. Reported OH numbers for mixtures relate to the number-average OH number of the mixture calculated from the OH numbers of the individual components in their respective molar proportions. The OH number indicates the amount of potassium hydroxide in milligrams which is equivalent to the amount of acetic acid bound by one gram of substance during acetylation. In the context of the present invention said number is determined according to the standard DIN 53240-2 (as at November 2007).

The isocyanate-reactive component A) contains at least one polyol component A1) selected from the group consisting of polyether polyols, polyester polyols, polyether ester polyols, polycarbonate polyols and polyether polycarbonate polyols.

The proportion of primary OH functions based on the total number of terminal OH functions of all polyols employed in the component A) is at least 30%, preferably at least 35%, especially preferably at least 38%.

The polyol component A1) has the further feature that it has a functionality f of >2.5, preferably ≥2.6-≤6.5 and particularly preferably ≥2.8-≤6.1.

The polyol component A1) preferably has a hydroxyl number of 280-600 mg KOH/g, particularly preferably of 300-580 mg KOH/g and especially preferably of 350-540 mg KOH/g.

In the context of the present application "a polyether polyol" may also be a mixture of different polyether polyols, this also applying analogously to the other polyols recited here.

The polyether polyols employable according to the invention are the polyether polyols employable in polyurethane synthesis and known to those skilled in the art.

Examples of polyether polyols that can be used are polytetramethylene glycol polyethers of the type obtainable via polymerization of tetrahydrofuran by means of cationic ring-opening.

Equally suitable polyether polyols are adducts of styrene oxide, ethylene oxide, propylene oxide, butylene oxide and/or epichlorohydrin or to di- or polyfunctional starter molecules. The addition of ethylene oxide and propylene oxide is especially preferred. Suitable starter molecules are for example water, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, bisphenols, in particular 4,4'-methylenebisphenol, 4,4'-(1-methylethylidene)bisphenol, 1,4-butanediol, 1,6-hexanediol and low molecular weight hydroxyl-containing esters of such polyols with dicarboxylic acids and oligoethers of such polyols.

It is preferable when based on its total weight the isocyanate-reactive component A) contains at least 50% by weight, preferably at least 60% by weight, especially preferably at least 70% by weight, of polyether polyol. In a preferred embodiment the component A1) consists of polyether polyol to an extent of 100% by weight.

Employable polyether ester polyols are compounds containing ether groups, ester groups and OH groups. Organic dicarboxylic acids having up to 12 carbon atoms are suitable for producing the polyether ester polyols, preferably aliphatic dicarboxylic acids having ≥4 to ≤6 carbon atoms or aromatic dicarboxylic acids used individually or in a mixture. Examples include suberic acid, azelaic acid, decanedicarboxylic acid, maleic acid, malonic acid, phthalic acid, pimelic acid and sebacic acid and in particular glutaric acid, fumaric acid, succinic acid, adipic acid, phthalic acid, terephthalic acid and isoterephthalic acid. Also employable in addition to organic dicarboxylic acids are derivatives of these acids, for example their anhydrides and also their esters and monoesters with low molecular weight monofunctional alcohols having ≥1 to ≤4 carbon atoms. The use of proportions of the abovementioned bio-based starting materials, in particular of fatty acids/fatty acid derivatives (oleic acid, soybean oil etc.), is likewise possible and can have advantages, for example in respect of storage stability of the polyol formulation, dimensional stability, fire behavior and compressive strength of the foams.

Polyether polyols obtained by alkoxylation of starter molecules such as polyhydric alcohols are a further component used for preparing polyether ester polyols. The starter molecules are at least difunctional, but can optionally also comprise portions of starter molecules which have higher functionality, in particular which are trifunctional.

Starter molecules include for example diols having number-average molecular weights Mn of preferably ≥18 g/mol to ≤400 g/mol, preferably of ≥62 g/mol to ≤200 g/mol, such as 1,2-ethanediol, 1,3-propanediol, 1,2-propanediol, 1,4-butanediol, 1,5-pentenediol, 1,5-pentanediol, neopentyl glycol, 1,6-hexanediol, 1,7-heptanediol, 1,8-octanediol, 1,10-decanediol, 2-methyl-1,3-propanediol, 2,2-dimethyl-1,3-propanediol, 3-methyl-1,5-pentanediol, 2-butyl-2-ethyl-1,3-propanediol, 2-butene-1,4-diol and 2-butyne-1,4-diol, ether diols such as diethylene glycol, triethylene glycol, tetraethylene glycol, dibutylene glycol, tributylene glycol, tetrabutylene glycol, dihexylene glycol, trihexylene glycol, tetrahexylene glycol and oligomeric mixtures of alkylene glycols, such as diethylene glycol. Starter molecules having functionalities other than OH can also be used alone or in a mixture.

In addition to the diols, compounds having >2 Zerewitinoff-active hydrogens, in particular having number-average functionalities of >2 to ≤8, in particular of ≥3 to ≤6, may also be co-used as starter molecules for producing the polyethers, for example 1,1,1-trimethylolpropane, triethanolamine, glycerol, sorbitan and pentaerythritol and also triol- or tetraol-started polyethylene oxide polyols having average molar masses Mn of preferably ≥62 g/mol to ≤400 g/mol, in particular of ≥92 g/mol to ≤200 g/mol.

Polyether ester polyols may also be prepared by the alkoxylation, in particular by ethoxylation and/or propoxylation, of reaction products obtained by the reaction of organic dicarboxylic acids and their derivatives and components with Zerewitinoff-active hydrogens, in particular diols and polyols. Derivatives of these acids that may be employed include for example their anhydrides, for example phthalic anhydride.

Suitable polyester polyols are inter alia polycondensates of di- and moreover tri- and tetraols and di- and moreover tri- and tetracarboxylic acids or hydroxycarboxylic acids or lactones. For the production of the polyesters it is also possible to use, instead of the free polycarboxylic acids, the corresponding polycarboxylic anhydrides or corresponding polycarboxylic esters of lower alcohols.

Examples of suitable diols are ethylene glycol, butylene glycol, diethylene glycol, triethylene glycol, polyalkylene glycols such as polyethylene glycols and also 1,2-propanediol, 1,3-propanediol, 1,3-butanediol, 1,4-butanediol, 1,6-hexanediol and isomers, neopentyl glycol or neopentyl glycol hydroxypivalate. Also employable in addition are polyols such as trimethylolpropane, glycerol, erythritol, pentaerythritol, trimethylolbenzene or trishydroxyethyl isocyanurate.

In addition, monohydric alkanols can also be co-used.

Examples of polycarboxylic acids that may be used include phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, or trimellitic acid. It is also possible to use the corresponding anhydrides as the acid source.

Additional co-use of monocarboxylic acids such as benzoic acid and alkanecarboxylic acids is also possible.

Hydroxycarboxylic acids that may be co-used as reaction participants in the preparation of a polyester polyol having terminal hydroxyl groups are for example hydroxycaproic acid, hydroxybutyric acid, hydroxydecanoic acid, hydroxystearic acid and the like. Suitable lactones include caprolactone, butyrolactone and homologs.

Suitable compounds for producing the polyester polyols also include in particular bio-based starting materials and/or derivatives thereof, for example castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower kernel oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, fatty acids, hydroxyl-modified and epoxidized fatty acids and fatty acid esters, for example based on myristoleic acid, palmitoleic acid, oleic acid, vaccenic acid, petroselic acid, gadoleic acid, erucic acid, nervonic acid, linoleic acid, alpha- and gamma-linolenic acid, stearidonic acid, arachidonic acid, timnodonic acid, clupanodonic acid and cervonic acid. Particular preference is given to esters of ricinoleic acid with polyfunctional alcohols, for example glycerol. Preference is also given to the use of mixtures of such bio-based acids with other carboxylic acids, for example phthalic acids.

Polycarbonate polyols that may be used are polycarbonates having hydroxyl groups, for example polycarbonate diols. These are obtainable via reaction of carbonic acid derivatives, such as diphenyl carbonate, dimethyl carbonate or phosgene, with polyols, preferably diols, or via copolymerization of alkylene oxides, for example propylene oxide, with $CO_2$.

Examples of such diols are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A and lactone-modified diols of the abovementioned type.

It is also possible to use, instead of or in addition to pure polycarbonate diols, polyether polycarbonate diols which for example are obtainable via copolymerization of alkylene oxides, for example propylene oxide, with $CO_2$.

Processes for preparing the polyols have been described for example by Ionescu in "Chemistry and Technology of Polyols for Polyurethanes", Rapra Technology Limited, Shawbury 2005, p. 55 et seq. (chapt. 4: Oligo-Polyols for Elastic Polyurethanes), p. 263 et seq. (chapt. 8: Polyester Polyols for Elastic Polyurethanes) and in particular on p. 321 et seq. (chapt. 13: Polyether Polyols for Rigid Polyurethane Foams) and p. 419 et seq. (chapt. 16: Polyester Polyols for Rigid Polyurethane Foams). It is also possible to obtain polyester polyols and polyether polyols by glycolysis of suitable polymer recyclates. Suitable polyether-polycarbonate polyols and the production thereof are described for example in EP 2910585 A, [0024]-[0041]. Examples relating to polycarbonate polyols and production thereof may be found inter alia in EP 1359177 A. Production of suitable polyether ester polyols is described inter alia in WO 2010/043624 A and in EP 1 923 417 A.

Polyether polyols, polyethercarbonate polyols and polyether ester polyols having a high proportion of primary OH functions are obtained when the alkylene oxides used for alkoxylation comprise a high proportion of ethylene oxide. The molar proportion of ethylene oxide structures based on the entirety of the alkylene oxide structures present in the polyols of the component A1 is in particular at least 50 mol %. The use of 100 mol % of ethylene oxide is likewise a preferred embodiment.

The isocyanate-reactive component A) may further contain low molecular weight isocyanate-reactive compounds, in particular di- or trifunctional amines and alcohols, particularly preferably diols and/or triols having molar masses $M_n$ of less than 400 g/mol, preferably of 60 to 300 g/mol, for example triethanolamine, diethylene glycol, ethylene glycol, glycerol, may be employed. Provided such low molecular weight isocyanate-reactive compounds are used for producing the rigid polyurethane foams, for example as chain extenders and/or crosslinking agents, and these do not also fall under the definition of component A1), they are advantageously employed in an amount of up to 5% by weight based on the total weight of the component A).

In addition the component A) may contain further isocyanate-reactive compounds, for example graft polyols, polyamines, polyamino alcohols and polythiols. It will be appreciated that the described isocyanate-reactive components also comprise such compounds having mixed functionalities.

A preferred isocyanate-reactive component A) consists to an extent of at least 65% by weight, in particular at least 80% by weight and very particularly preferably to an extent of at least 90% by weight of the polyol component A1) which has a hydroxyl number between 280 to 600 mg KOH/g and a functionality of ≥2.8 to ≤6.0, and the proportion of primary OH functions in the component A) is at least 35% (based on all terminal OH functions in the component A).

The isocyanate-reactive component A) may contain at least one or more cell-opening compounds A3). Cell-opening compounds are described for example in Kunststoff-Handbuch, volume 7, Polyurethane, Carl Hanser Verlag, Munich/Vienna, 3rd edition, 1993, pages 104-127. These are, for example, silicones, such as polyether-polydimethylsiloxane copolymers, or organic polymers, for example those based on polybutadiene (for example Ortegol 500 and 501 from Evonik Industries), surfactants, for example the sodium salt of ethoxylated and sulfated isotridecyl alcohol obtainable under the trade name Sermul EA266 (Elementis Specialties, The Netherlands), and also mixtures of different components, for example mixtures of amine-stabilized, macromolecular, unsaturated hydrocarbons and phthalate esters. Cell openers based on polybutadiene are preferred. The cell-opening components are preferably employed in amounts of not more than 1% by weight based on the isocyanate-reactive component (A). Particular preference is given to the use of 0.1-1.0% by weight of organic polymer based on polybutadiene, very particularly preferably 0.25-0.75% by weight, in each case based on the total weight of the component A).

Assistant and additive substances A6) that may be employed in the process according to the invention are the customary assistant and additive substances known from the prior art and to the person skilled in the art. These include for example surface-active substances, stabilizers, in particular foam stabilizers, cell regulators, fillers, dyes, pigments, flame retardants, antistats, antihydrolysis agents and/or fungistatic and bacteriostatic substances.

Several of the known cell opening compounds, for example the silicones, may also simultaneously assume roles as surface-active substances, stabilizers or cell regulators. In this case it is also possible to employ amounts of these components higher than the preferred amounts recited hereinabove for the cell opening compounds.

Polyether-polydimethylsiloxane copolymers are often used, preferably a polyethylene oxide-polyether having oligodimethylsiloxane end groups, wherein the number of dimethyl siloxane units is preferably ≤5.

Employable stabilizers also include saturated and unsaturated hydrocarbons such as paraffins, polybutadienes, fatty alcohols and esters, for example esters of carboxylic acids.

Also employable as stabilizers are surfactants, for example alkoxylated alkanols such as ethers of linear or branched alkanols having ≥6 to ≤30 carbon atoms with polyalkylene glycols having ≥5 to ≤100 alkylene oxide units, alkoxylated alkylphenols, alkoxylated fatty acids, carboxylic esters of an alkoxylated sorbitan (especially Polysorbate 80), fatty acid esters, polyalkyleneamines, alkyl sulfates, phosphatidylinositols, fluorinated surfactants, surfactants comprising polysiloxane groups and/or bis(2-ethyl-1-hexyl) sulfosuccinate. Fluorinated surfactants may be perfluorinated or partially fluorinated. Examples thereof are partially fluorinated ethoxylated alkanols or carboxylic acids.

The component A) preferably contains a total of not more than 5% by weight of surfactants, especially preferably not more than 3% by weight, more preferably less than 2% by weight and especially preferably not more than 1.6% by weight of surfactants based on the total weight of the component A).

Catalysts A2) are used for the production of the rigid PUR/PIR foam. Compounds usually used as catalysts accelerate the reaction of the compounds comprising hydroxyl groups or isocyanate-reactive groups in the components with the isocyanate groups of the component B.

The catalysts preferably contain at least one catalytically active amine compound having functional groups which comprise Zerewitinoff-active hydrogens and can therefore react with isocyanate (so-called "incorporable catalysts"). Examples of employable incorporable catalysts are bis(dimethylaminopropyl)urea, bis(N,N-dimethylaminoethoxyethyl)carbamate, dimethylaminopropylurea, N,N,N-trimethyl-N-hydroxyethylbis(aminopropyl ether), N,N,N-trimethyl-N-hydroxyethylbis(aminoethyl ether), diethylethanolamine, bis(N,N-dimethyl-3-aminopropyl)amine, dimethylaminopropylamine, 3-dimethyaminopropyl-N,N-dimethylpropane-1,3-diamine, dimethyl-2-(2-aminoethoxyethanol) and (1,3-bis(dimethylamino)propan-2-ol), N,N-bis(3-dimethylaminopropyl)-N-isopropanolamine, bis(dimethylaminopropyl)-2-hydroxyethylamine, N,N,N-trimethyl-N-(3-aminopropyl)bis(aminoethyl ether), 3-dimethylaminoisopropyldiisopropanolamine or mixtures thereof.

In a preferred embodiment the abovementioned catalysts are employed in an amount of ≥0.01% to <2% by weight based on the total weight of the component A).

Also employable are one or more further catalyst compounds, especially the catalytically active compounds known for PUR/PIR chemistry, including not only further amine compounds but also salts such as for example tin(II) acetate, tin(II) octoate, tin(II) ethylhexoate, tin(II) laurate, dibutyltin diacetate, dibutyltin dilaurate, dibutyltin maleate, dioctyltin diacetate, tris(N,N-dimethylaminopropyl)-s-hexahydrotriazine, tetramethylammonium hydroxide, sodium acetate, sodium octoate, potassium acetate, potassium octoate, sodium hydroxide.

The catalysts are generally employed in an amount from 0.001% to 5% by weight, in particular from 0.05% to 2.5% by weight, based on the weight of the component A. It is particularly preferable when both incorporable catalysts and non-incorporable catalysts are employed as catalysts. It is especially preferable when incorporable amine compounds and catalytically active salts are employed in combination.

In the production of the rigid PUR/PIR foam supercritical carbon dioxide (A4) is employed and optionally an additional blowing agent component A5) is used. It is preferable to employ 0.5 to 30 parts by weight of additional blowing agents A5) based on 100 parts by weight of the component A. Additional blowing agents employed are preferably physical blowing agents. In the context of the present invention "physical blowing agents" are to be understood as meaning compounds which on account of their physical properties are volatile and unreactive toward the isocyanate component.

It is preferable when the physical blowing agents selected from hydrocarbons (for example n-pentane, isopentane, cyclopentane, butane, isobutane, propane), ethers (for example methylal), halogenated ethers, perfluorinated and partially fluorinated hydrocarbons having 1 to 8 carbon atoms, for example perfluorohexane, HFC 245fa (1,1,1,3,3-pentafluoropropane), HFC 365mfc (1,1,1,3,3-pentafluorobutane), HFC 134a or mixtures thereof are used, and also (hydro)fluorinated olefins, for example HFO 1233zd(E) (trans-1-chloro-3,3,3-trifluoro-1-propene) or HFO 1336mzz (Z) (cis-1,1,1,4,4,4-hexafluoro-2-butene) or additives such as FA 188 from 3M (1,1,1,2,3,4,5,5,5-nonafluoro-4-(trifluoromethyl)pent-2-ene), and also mixtures thereof with one another.

Chemical blowing agents may also be employed in addition to or even instead of the abovementioned physical blowing agents. These are particularly preferably water and/or formic acid.

The component B) is a polyisocyanate, i.e. an isocyanate having an NCO functionality of ≥2. Examples of such suitable polyisocyanates include 1,4-butylene diisocyanate, 1,5-pentane diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or their mixtures of any desired isomer content, 1,4-cyclohexylene diisocyanate, 1,4-phenylene diisocyanate, 2,4- and/or 2,6-toluene diisocyanate (TDI), 1,5-naphthylene diisocyanate, 2,2'- and/or 2,4'- and/or 4,4'-diphenylmethane diisocyanate (MDI) and/or higher homologs, 1,3- and/or 1,4-bis(2-isocyanatoprop-2-yl) benzene (TMXDI), 1,3-bis(isocyanatomethyl)benzene (XDI) and also alkyl 2,6-diisocyanatohexanoates (lysine diisocyanates) having C1 to C6-alkyl groups.

Materials used as isocyanate component B) are preferably mixtures of the isomers of diphenylmethane diisocyanate ("monomeric MDI"), abbreviated to "mMDI") and its oligomers ("oligomeric MDI"). The term "polymeric MDI" (pMDI) is in general used for mixtures of monomeric MDI and oligomeric MDI. The oligomers of MDI are polyphenyl polymethylene polyisocyanates having a relatively large number of rings, i.e. mixtures of the homologs of diphenylmethylene diisocyanate which have a relative large number of rings and which have an NCO functionality f>2 and have the following structure formula: $C_{15}H_{10}N_2O_2 [C_8H_5NO]_n$, wherein n=integer >0, preferably n=1, 2, 3 and 4. Higher-nuclear homologs ($C_{15}H_{10}N_2O_2 [C_8H_5NO]_m$, m=integer ≥4) may likewise be present in the mixture of organic polyisocyanates a). Likewise preferred as the isocyanate component B) are mixtures of mMDI and/or pMDI comprising at most up to 20% by weight, more preferably at most 10% by weight, of further aliphatic, cycloaliphatic and especially aromatic polyisocyanates known for the production of polyurethanes, very particularly TDI.

In addition to the abovementioned polyisocyanates, it is also possible to co-use proportions of modified diisocyanates having a uretdione, isocyanurate, urethane, carbodiimide, uretonimine, allophanate, biuret, amide, iminooxadiazinedione and/or oxadiazinetrione structure and also unmodified polyisocyanate having more than 2 NCO groups per molecule, for example 4-isocyanatomethyl-1,8-octane diisocyanate (nonane triisocyanate) or triphenylmethane 4,4',4"-triisocyanate.

Suitable NCO prepolymers can also be used as organic isocyanate component B), instead of or in addition to the abovementioned polyisocyanates. The prepolymers are producible by reaction of one or more polyisocyanates with one or more of the above-described polyols.

The isocyanate may be a prepolymer obtainable by reacting an isocyanate having an NCO functionality of ≥2 and polyols having a molecular weight of ≥62 g/mol to ≤8000 g/mol and OH functionalities of ≥1.5 to ≤6.

The NCO content is preferably from ≥29.0% by weight to ≤32.0% by weight and preferably has a viscosity at 25° C. of ≥80 mPas to ≤2000 mPas, particularly preferably of ≥100 mPas to ≤800 mPas (dynamic viscosity determined according to DIN 53019 at 25° C.).

The number of NCO groups in the polyisocyanate component B) and the number of isocyanate-reactive groups of the component A) may be in a numerical ratio to one another that is by way of example ≥50:100 to ≤500:100. The rigid polyurethane foams are produced generally by reacting the components A) and B) in amounts such that the isocyanate index in the formulation is 80-150, preferably 90-130, particularly preferably 95-110. In this range urethane groups are preferably formed. In another preferred embodiment the isocyanate index is 150-400. In this range the foams comprise a high proportion of isocyanurate functions which bring about for example an inherent flame retardancy of the foams.

The mixing of the components of the reaction mixture may be effected under pressure in a high-pressure mixing head. Suitable fields of application of the PUR/PIR insulation bodies produced according to the invention include in particular industrial insulation of appliances such as refrigerators, freezers, fridge-freezers and boilers, cool containers and coolboxes and also of pipes.

EXAMPLES

Employed Standards/Analytical Instruments:
Determination of apparent density: Foams composed of rubber and plastics—determination of apparent density (ISO 845:2006); German version EN ISO 845:2009
Determination of open-cell content: Determination of volume fraction of open and closed cells (ISO 4590:2002); German version EN ISO 4590:2003
Determination of compressive strength: Rigid foams—determination of pressure properties (ISO 844:2014); German version EN ISO 844:2014
Determination of OH number: Determination of hydroxyl number—part 2: Method with catalyst according to DIN 53240-2, November 2007 version
Determination of cell size: Optical microscopy evaluation using a VHX 5000 optical microscope; the test specimen to be analyzed is examined at 3 different points in each case over a circular region having a diameter of 5 mm. The resolution here is chosen such that the selected region captures more than 100 cells. All cells are subsequently evaluated with the freely available software ImageJ and the obtained ECD values (Equivalent Circle Diameter) used to calculate the D90 value (90% of the cells are smaller than this value) and the average cell diameter.

The indicated functionality fin table 1 relates to the number-average functionality of the mixture of the polyols present in the formulation.

The indicated duration of foam production in table 1 describes the duration between the juncture of mixing of $CO_2$ and the polyol formulation and the juncture of demolding/evacuation of the cured PU foam.

Determination of Thermal Conductivity:
1) Thermal Conductivity Value Measurement According to the Dynamic Hot Wire Method:
A platinum wire (diameter 100 μm) is embedded in the sample and serves simultaneously as a heating element and a temperature sensor. The measurement apparatus is incorporated into a vacuum chamber whose internal pressure is determined by means of a pressure sensor (Baratron®, MKS Instruments Deutschland GmbH, Munich). The required gas pressure is established by controlled charging with gaseous nitrogen via a needle valve.

During the measurement the wire is heated with a constant electrical power. The profile of the average temperature of the heating wire over time may be captured via the temperature-dependent wire resistance which is in turn measured by simultaneous measurement of the voltage drop over a shunt resistor connected in series with the heating line and of the voltage drop over the potential taps on the heating wire. Two multimeters (type HP3457A, Hewlett-Packard, Palo Alto, USA) were used as voltmeters. This temperature profile depends on the thermal conductivity of the sample. The thermal conductivity of the sample is determined by adapting an analytical solution (siehe Ebert H.-P. et al., High Temp.—High Press., 1993, 25, 391-402) to this time-dependent temperature curve, taking into account the thermal contact resistance between the sample and the wire as well as heat losses in the axial direction. Foam body measuring 50×50×100 mm at 23° C.

2) Thermal Conductivity Measurement with a Heat Flow Measuring Plate Instrument According to DIN 52616 (November 1977); Foam Body Measuring 200×200×30 mm at 10° C. and/or 23° C.

$CO_2$— and n-pentane-blown polyurethane foams were produced according to the formulations recited in the following table 1. Unless otherwise stated the specified amounts are to be understood as weight fractions. The following substances and materials were used:

Polyol 1: Polyether polyol based on trimethylolpropane and propylene oxide having a hydroxyl number of 800 mg KOH/g, a functionality of 3 and a viscosity of 6100 mPa·s at 25° C.

Polyol 2: Polyether polyol based on trimethylolpropane and ethylene oxide having a hydroxyl number of 550 mg KOH/g, a functionality of 3 and a viscosity of 505 mPa·s at 25° C.

Polyol 3: Polyether polyol based on trimethylolpropane and propylene oxide having a hydroxyl number of 550 mg KOH/g, a functionality of 3 and a viscosity of 1800 mPa·s at 25° C.

Polyol 4: Polyether polyol based on 1,2-propanediol and propylene oxide having a hydroxyl number of 56 mg KOH/g, a functionality of 2 and a viscosity of 310 mPa·s at 25° C.

Polyol 5: Polyether polyol based on 1,2-propanediol and propylene oxide having a hydroxyl number of 112 mg KOH/g, a functionality of 2 and a viscosity of 140 mPa·s at 25° C.

Polyol 6: Polyether polyol based on glycerol and propylene oxide having a hydroxyl number of 231 mg KOH/g, a functionality of 3 and a viscosity of 350 mPa·s at 20° C.

Tegostab B 8443: Foam stabilizer (Evonik)

Ortegol 500: Cell opener (Evonik)

Ortegol 501: Cell opener (Evonik)

Desmorapid PU 1792: Catalyst, 25% potassium acetate in diethylene glycol (Covestro)

Dabco NE1070: Catalyst, 3-(dimethylamino)propylurea (Air Products)

n-Pentane: Blowing agent

Isocyanate: Mixture of monomeric and polymeric MDI having a viscosity of about 290 mPa·s at 20° C. (Desmodur 44V20L, Covestro)

Barrier film: Multilayer film consisting of polyethylene terephthalate, polyethylene and aluminum.

Production of PU-Based Insulation Bodies, Example 1 (Inventive) and 3, 4 and 5 (Comparative)

A polyol formulation was produced from the polyols, stabilizers and catalysts recited in table 1 hereinbelow in a high-pressure plant. This formulation was mixed with the blowing agent $CO_2$ with a static mixer at a pressure of 160 bar and a temperature of 50° C. (supercritical conditions). This mixture was mixed with the isocyanate conveyed at a pressure of 160 bar and a temperature of 35° C. in a high-pressure mixing head. The thus obtained reaction mixture was injected into a pressurized cavity of a closed mold at a mold temperature of 50° C. The mold may be provided with a barrier film. After termination of the injection (so-called shot time) the pressure was maintained for a time (so-called cream time) and then decompressed to ambient pressure over <2 s (so-called relaxation time). The precise formulations and plant parameters are summarized in table 1, the results of the physical tests on the insulation bodies, in particular the foams, in table 2.

Production of Molded Polyurethane Foam Bodies, Example 6 (Comparative)

To produce polyurethane-based molded foam bodies, a polyol formulation was produced from the polyols, stabilizers and catalysts recited in table 1 below and also the blowing agent. To produce the reaction mixture the isocyanate was mixed using a Pendraulik stirrer for 7 seconds at 23° C. and introduced in a mold. The mold was closed immediately. After 5 minutes the mold was opened and the molded body was demolded. The precise formulation is summarized in table 1, the results of the physical tests on the molded foam in table 2.

Example 2 (Comparative)

All data are taken from patent publication WO2018/018571 A1, example 2, and for comparison inserted into tables 1 and 2.

TABLE 1

| | | Example 1 | Comparative example 2 WO 2018/018571 A1, Example 2 | Comparative example 3 | Comparative example 4 | Comparative example 5 | Comparative example 6 |
|---|---|---|---|---|---|---|---|
| Polyol 1 | [parts by wt] | 13.00 | — | 13.00 | 13.00 | 13.00 | 13.00 |
| Polyol 2 | [parts by wt] | 32.50 | — | 32.50 | — | — | — |
| Polyol 3 | [parts by wt] | — | — | — | 32.50 | 32.50 | 32.50 |
| Polyol 4 | [parts by wt] | 13.50 | — | 13.50 | 13.50 | 13.50 | 13.50 |
| Polyol 5 | [parts by wt] | 9.50 | — | 9.50 | 9.50 | 9.50 | 9.50 |
| Polyol 6 | [parts by wt] | 27.00 | — | 27.00 | 27.00 | 27.00 | 27.00 |
| VORATEC ™ SD301 | [parts by wt] | — | 47.55 | — | — | — | — |
| VORANOL ™ CP 260 | [parts by wt] | — | 38.00 | — | — | — | — |
| TERCAROL 5903 | [parts by wt] | — | 9.50 | — | — | — | — |
| Tegostab B 8443 | [parts by wt] | 1.50 | — | 1.50 | 1.50 | 1.50 | 1.50 |
| Ortegol 500 | [parts by wt] | 0.40 | — | 0.40 | — | — | — |
| Ortegol 501 | [parts by wt] | 0.10 | — | 0.10 | — | — | — |
| L6164 | [parts by wt] | — | 2.00 | — | — | — | — |
| Desmorapid PU 1792 | [parts by wt] | 2.50 | — | 2.50 | 2.50 | 2.50 | 2.50 |
| DABCO NE1070 | [parts by wt] | 1.65 | — | 1.65 | 1.65 | 1.65 | 1.65 |
| POLYCAT ®-5 | [parts by wt] | — | 0.48 | — | — | — | — |
| POLYCAT ®-8 | [parts by wt] | — | 1.90 | — | — | — | — |
| POLYCAT ®-41 | [parts by wt] | — | 0.57 | — | — | — | — |
| Functionality f of polyols | | 2.9 | 3.1 | 2.9 | 2.9 | 2.9 | 2.9 |
| Isocyanate | [parts by wt] | 97.20 | — | 97.20 | 97.20 | 97.20 | 97.20 |
| Papi ™-135C | | — | 101.00 | — | — | — | — |
| n-Pentane | [parts by wt] | — | — | — | — | — | 14.40 |
| Supercritical $CO_2$ | [parts by wt] | 3.56 | Yes; amount n.s. | 3.50 | 3.57 | 5.90 | — |
| Index | NCO/OH | 100.00 | 115.00 | 100.00 | 100.00 | 100.00 | 100.00 |
| Gas counterpressure in the cavity | [bar] | 7.7 | n.a. | 8.3 | 8.2 | 13.0 | — |
| Shot time | [s] | 2.0 | n.a. | 1.7 | 2.0 | 1.2 | — |
| Cream time | [s] | 4.0 | 560‡ | 4.3 | 8.0 | 9.8 | — |
| Relaxation time | [s] | <2 | n.a. | <2 | <2 | <2 | — |
| Duration of foam production | [min] | 11 | 39 + x† | 11 | 11 | 11 | — |
| Barrier film | | yes | yes | no | no | no | no |

‡The cream time in comparative example 2 is the time between the addition of the polyol formulation to the reactor and the injection of the PU mixture into the mold provided with barrier material. The duration of injection is not specified.
†The duration between injecting and evacuating the cured PU foam is not specified.
n.s. - not specified

TABLE 2

|  |  | Example 1 | Comparative example 2 | Comparative example 3 | Comparative example 4 | Comparative example 5 | Comparative example 6 |
|---|---|---|---|---|---|---|---|
| Mechanics | | | | | | | |
| Apparent density | [kg/m$^3$] | 72 | 115[1] | 70 | 71 | 45 | 39 |
| Parallel compressive strength at 10% compression | [MPa] | n.d.[2] | n.s.[3] | 0.32 | n.d.[2] | n.d.[2] | 0.16 |
| Transverse compressive strength at 10% compression | [MPa] | n.d.[2] | n.s.[3] | 0.22 | n.d.[2] | n.d.[2] | 0.11 |
| Cell internal pressure | [mbar] | 0.3 | 2 | 1013 | 1013 | 1013 | 1013 |
| Thermal conductivity | [mW · m$^{-1}$ · K$^{-1}$] | 9.6 @ 10° C. | 13.0 @ 23° C. | 34.9 @ 23° C.[4] | 23.8 @ 23° C. 22.7 @ 10° C. | 21.9 @ 23° C. 20.5 @ 10° C. | 25.3 @ 23° C. 29.1 @ 10° C. |
| Open-cell content | [%] | 96 | 95 | 95 | 4.2 | 6.4 | 8.0 |
| Average cell size | [μm] | 77 | 9 | 61 | 72 | 75 | 212 |
| D90 | [μm] | 101 | n.s.[3] | 86 | 92 | 107 | 316 |

[1] calculated from specified porosity of 90 with typical PU density of 1150 kg/m$^3$
[2] not determined
[3] not specified
[4] determined according to hot wire method, see determination of thermal conductivity 1)

Example 1 shows that the insulation body produced with the process described in the present invention has a low lambda value. One less process step is required than in comparative example 3. There, the produced foam would still have to be laminated and evacuated.

Example 2 described in patent publication WO 2018/018571 A1 (here comparative example 2) shows that the process duration is markedly longer than in inventive example 1 and at 13 mW·m$^{-1}$K$^{-1}$ thermal conductivity is markedly higher than in inventive example 1.

Comparative example 3 shows that the foam produced under comparable conditions without evacuation and a barrier film has a markedly higher lambda value.

The foam produced in comparative example 4 also exhibits a markedly higher lambda value than that in example 1 despite its closed-cell structure. Even with a decrease in apparent density from 71 to 45 kg/m$^3$ and a closed-cell structure as shown in comparative example 5 the lambda value is still markedly higher than that in example 1.

The foam produced in comparative example 6 exhibits a markedly higher lambda value than that in inventive example 1 despite its closed-cell structure and foaming with pentane as blowing agent.

The invention claimed is:

1. A process for producing an insulation body based on a fine- and open-celled polyurethane/polyisocyanurate foam in a cavity of a mold, comprising:
   a. optionally inserting an optionally pre-molded insert into the cavity of the mold,
   b. inserting a barrier film into the cavity or, if present, onto or into the insert,
   c. applying a pressure of 8-30 bar in the cavity,
   d. injecting a polyurethane reactive mixture containing supercritical $CO_2$ into the pressurized cavity,
   e. decompressing to ambient pressure after a time of 1 to 40 seconds measured after the injection,
   f. curing the polyurethane reactive mixture,
   g. applying a vacuum of 0.001 mbar to 0.5 mbar in the cavity,
   h. sealing any holes in the barrier film, and
   i. demolding the resulting insulation body.

2. The process for producing an insulation body according to claim 1, wherein a gas scavenger material is introduced between step b) and c) and/or between step f) and g).

3. The process for producing an insulation body as claimed in claim 1, wherein the polyurethane reactive mixture comprises:
   A) isocyanate-reactive component comprising:
      A1) at least one polyol component having a functionality f of >2.5 selected from the group consisting of polyether polyols, polyester polyols, polycarbonate polyols, polyether polycarbonate polyols and polyether ester polyols, wherein the proportion of all primary OH functions present in the component A1) based on the total number of terminal OH functions in the component A1) is at least 30%,
      A2) at least one catalyst component having Zerewitinoff-active hydrogens,
      A3) at least one cell-opening compound,
      A4) supercritical $CO_2$,
      A5) optionally blowing agents with the exception of supercritical $CO_2$, and
      A6) optionally auxiliary and/or additive substances and
   B) at least one polyisocyanate component,
   wherein, relative to component A), component B) is present in an amount such that a ratio of the number of moles of NCO groups from component B) to the number of moles of OH groups from component A1) is 80 to 400.

* * * * *